Figure 1:
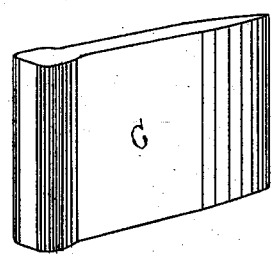

J. M. LAUGHLIN.
Process of Manufacturing Horseshoe Nails.

No. 235,540.                    Patented Dec. 14, 1880.

Witnesses
Wm. S. Brown
Henry F. Welch

Inventor
Joseph M. Laughlin
by L. C. Rice
Attorney

UNITED STATES PATENT OFFICE.

JOSEPH M. LAUGHLIN, OF BOSTON, ASSIGNOR TO BRIDGEWATER IRON COMPANY, OF BRIDGEWATER, MASSACHUSETTS.

PROCESS OF MANUFACTURING HORSESHOE-NAILS.

SPECIFICATION forming part of Letters Patent No. 235,540, dated December 14, 1880.

Application filed January 6, 1879.

*To all whom it may concern:*

Be it known that I, JOSEPH M. LAUGHLIN, of Boston, county of Suffolk, State of Massachusetts, have invented certain Improvements in the Process of Manufacturing Horseshoe-Nails, of which the following is a specification.

My invention relates to the process of cutting or punching finished horseshoe-nails from a plate of prepared metal made substantially according to the Letters Patent granted to D. J. Harrington, February 2, 1875, or the Letters Patent granted to me November 7, 1876.

Previous to my present invention it has always been attempted to cut the finished horseshoe-nails from these prepared plates by causing the punch to descend upon the side of the plate which is grooved or spotted, and drive the nail out of the plate in a direction from the side of the plate so grooved or spotted in preparation for punching the nail therefrom.

It has been found, by experiment, that this method of punching the nail from the nail-plate, for some reason which I cannot fully explain, does not leave a proper point and edge upon the horseshoe-nails when the same are punched in quantities from the plate; and, also, that when the nails are attempted to be punched from the plate in this direction, great wear and breakage of the punches ensue, which not only produces a very inferior quality of nails, but also damages other parts of the machine, and causes great expense to be incurred in keeping it in order.

By practice, it appears that punching the nails from the prepared plates in the direction above described is a very difficult process. I attribute this in part to the fact that when the nails are punched out, as above described, the flat side of the nail-plate rests solidly upon the surface of the female die ordinarily used in punching, while the punching-die, descending upon the other or spotted side of the plate, also strikes firmly or solidly upon all parts of the spotted surface of the plate, to which it must be made to conform in order to produce the finished nail. There is thus left no yield or play between the dies and the hardened part of the metal plate which is to form the point of the finished nail, and the shock of the blow upon this part of the plate acts with great force upon the point end of the nail die or punch where it is smallest and least liable to resist such effects.

My improved process consists in bringing the prepared plates in proper position over the female die with the spotted or grooved side of the plate next to the female die, and then causing the male die or punch to descend upon the opposite or smooth side of the plate and drive or punch the finished nail from the plate from that direction which is opposite that first-above described. By this process the part of the plate which has been spotted and thus hardened or condensed preparatory to forming the point of the finished nail therefrom, is held in a fixed position and at some little distance above the female die preparatory to the descent of the punch upon the opposite side, to drive out the finished nail from the plate. When the punch or male die descends upon the opposite side of the plate these harder portions of the plate which have been spotted are not immediately in contact with the female die, as above described, and hence the male die or punch receives no shock by that part of the plate which is to form the point of the nail at the instant of its first impact with the metal, and by the time the hardened portion of the plate, which is to form the point of the nail, is driven downward to a contact with the female die, it is traveling with the speed and force of the punch behind it, against which it rests solidly, so as to be in effect a part or nose of the punch itself. In this position, and thus coming in contact with the female die, it communicates a comparatively small shock to the surface of the male die or punch, and does not affect it so disastrously as when it is attempted to be used to punch the nails from the plate in the opposite direction.

It is also found that when the nails are punched from the prepared plate in the direction required by my invention the nails come from the plate with their edges perfect and completely finished for the market, which is not the case when the punching is done in the manner first-above described.

Figure 2:
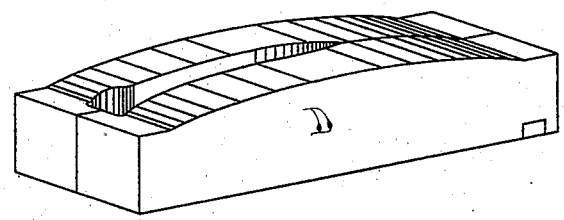
Figure 3:
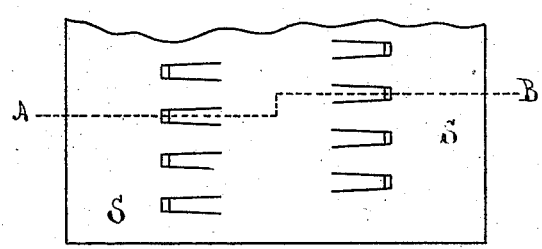
Figure 4:
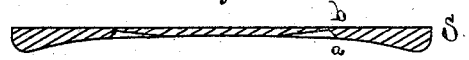

In the drawings, Figure 1 represents the punch or male die. Fig. 2 represents the female die. Fig. 3 represents the upper surface of the nail-plate prepared by being spotted, in the usual manner. Fig. 4 represents a transverse section of the plate through the dotted line A B of Fig. 3.

S is the nail-plate, having spots or condensed portions previously made upon its side $a$ in any of the well-known ways of producing them. $b$ is the opposite side of the plate. C is the male die or punch. D is the female die.

To carry out my invention the prepared nail-plate S is placed upon the female die D, with the side $a$ next to the die D, and in proper position to form the points of the nails from the condensed or spotted parts of the plate S when they are punched therefrom.

It will be observed that the upper surface of the die D is made considerably more convex than any concavity of the side $a$ of the nail-plate S which rests upon it.

By this construction of parts the lower surface, $a$, of the nail-plate S is held away from contact with the die D until the punch has forced it against the die D in its descent. The male die or punch C is then brought down upon the side $b$ of the plate S, exactly opposite the female die D, driving the finished nail from the plate through the latter in the manner in which such punches commonly operate.

It has been found that, while previous to my improved method of punching such finished horseshoe-nails from the plate it could not be continuously practiced as a successful branch of manufacture, since my improvement has been applied horseshoe-nails can be successfully punched in a finished state from the prepared nail-plate, as above described, with the same set of dies and punches, in large quantities and for a great length of time, without material injury to the punch and dies, substantially as described.

What I claim as new and of my invention is—

1. The described method of punching finished horseshoe-nails from the prepared nail-plate S from its plane side $b$ toward its spotted side $a$, substantially as described.

2. The described method of punching finished horeshoe-nails from a prepared nail-plate, by placing the prepared plate in such a position between the male and female dies that the male die or punch shall come into contact with the surface of the nail-plate, while certain parts of the opposite surface of the nail-plate are held away from contact with the female die, to enable these parts of the metal which are to form the finished horseshoe-nail to receive the impact of the male die first and be driven forward by it into contact with the female die, substantially as described.

3. The described combination of the straight-faced male die and a female die having a convexity, substantially such as described—that is to say, such that it will shear the finished nail from the prepared plate and produce it substantially in the form in which it is to be used.

JOSEPH M. LAUGHLIN.

Witnesses:
DAVID HALL RICE,
L. C. RICE.